United States Patent
Ishii

(10) Patent No.: US 6,847,469 B1
(45) Date of Patent: Jan. 25, 2005

(54) IMAGE PROCESSING APPARATUS FOR REMOVING AN ISOLATED POINT

(75) Inventor: Rie Ishii, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/468,954

(22) Filed: Dec. 22, 1999

(30) Foreign Application Priority Data

Dec. 24, 1998 (JP) .......................................... 10-367788

(51) Int. Cl.$^7$ ............................................ G06K 15/00
(52) U.S. Cl. ...................................... 358/1.9; 266/260
(58) Field of Search ................................ 358/1.9, 3.01, 358/3.06, 3.09, 3.1, 3.13, 3.27, 534; 382/205, 212, 217, 260, 261, 262, 263, 264, 266, 267, 268

(56) References Cited

U.S. PATENT DOCUMENTS 4,873,515 A * 10/1989 Dickson ...................... 340/728
6,115,508 A * 9/2000 Lopresti ...................... 382/306
6,160,913 A * 12/2000 Lee ............................. 382/176
6,181,437 B1 * 1/2001 Sawada ....................... 358/1.9

FOREIGN PATENT DOCUMENTS

JP 8-305844 11/1996
JP 9-6917 1/1997

\* cited by examiner

*Primary Examiner*—Jerome Grant, II
(74) *Attorney, Agent, or Firm*—Oblon, Spivak, McClelland, Maier & Neustadt, P.C.

(57) ABSTRACT

An image processing apparatus efficiently removes an isolated point. A pixel area comprising a matrix area and a line area extending from the matrix area is defined. The matrix area includes a plurality of pixels forming a matrix so that a center pixel which is being processed is located in the center of the matrix. The line area includes a predetermined number of pixels along a scan line in which the center pixel is included so that the predetermined number of pixels extend from the matrix area. The center pixel is subjected to an isolated point removing process by referring to the pixels included in the pixel area.

24 Claims, 9 Drawing Sheets

FIG. 6

| | L1 | L2 | L3 | L4 | L5 |
|---|---|---|---|---|---|
| | 01 | 01 | 11 | 11 | 01 |
| | 01 | 01 | 11 | 11 | 11 |
| | 01 | 11 | 01 | 11 | 11 |
| | 01 | 11 | 01 | 11 | 11 |
| | 11 | 11 | 01 | 11 | 11 |
| | 01 | 01 | 11 | 01 | 01 |
| | 01 | 11 | 11 | 01 | 01 |
| | 01 | 11 | P | 01 | 01 |
| | 01 | 11 | 11 | 01 | 01 |
| | 01 | 01 | 11 | 01 | 01 |
| | 11 | 01 | 11 | 11 | 01 |
| | 01 | 01 | 11 | 01 | 01 |
| | 01 | 01 | 01 | 11 | 01 |
| | 01 | 11 | 01 | 11 | 01 |
| | 01 | 11 | 01 | 11 | 01 |

IMAGE PROCESSING APPARATUS FOR REMOVING AN ISOLATED POINT

BACKGROUND OF THE INVENTION

1. Field of the Invention

The present invention generally relates to an image processing apparatus and, more particularly, to an image processing apparatus which processes pixels by a single instruction multiple data stream (SIMD) control method and removes an isolated point included in an image.

2. Description of the Related Art

Many printed materials have an isolated point (or an isolated dot) which is not a real part of an image or a character printed on a recording material. Such an isolated point may be undesirably formed on a recording material, for example, due to scattering of toner in a printing process. If a copy is taken based on the printed material having such an isolated point for a plurality of times, the isolated point may be enhanced by the copying operations which may result in deterioration of an image quality.

Accordingly, methods for removing such an isolated point have been suggested. Japanese Laid-Open Patent Application No. 9-6917 discloses a method for detecting an isolated point based on a run length of a white pixel run and a black pixel run. Hereinafter, this method is referred to as a run length method. Japanese Laid-Open Patent Application No. 8-305844 discloses a method for detecting an isolated point based on intensity of pixels forming an area surrounding a currently processed pixel. Hereinafter, this method is referred to as an area method.

In a conventional circuit for performing the run length method or the area method, single-pixel data is supplied for each pixel clock cycle. FIG. 1 is a bock diagram of an image processing unit provided in a conventional copy machine. In FIG. 1, pixel data corresponding to a single pixel is supplied from a scanner 201 to the image processing unit 202 for each cycle of a pixel clock signal.

The image processing unit 202 comprises a filtering unit 203, an isolated point removing unit 204, a is elector 205, a gamma processing unit 206 and a gradation processing unit 207. The pixel data generated by the scanner 201 is supplied to both the filtering unit 203 and the isolated point removing unit 204 so as to simultaneously performing a filtering process and an isolated point removing process. An output of the filtering unit 203 and an output of the isolated point removing unit 204 are selected by the selector 205. The selected output is supplied to a printer (not shown in the figure) via the gamma processing unit 206 and the gradation processing unit 207.

The filtering unit 203 performs an enhancement process and a smoothing process on the pixel data, and selectively outputs one of the enhanced pixel data and smoothed pixel data to the selector 205.

Recently, the single instruction multiple data stream (SIMD) control method has become used in a copy machine. In the SIMD control method, data corresponding to a plurality of pixels is supplied at the same time, and the plurality of pixels are processed simultaneously. That is, for example, pixel data corresponding to one scan line, which may include pixel data of a few hundreds pixels, is simultaneously processed by a single instruction so as to reduce a processing time.

The above-mentioned run length method can be used with a small memory capacity and is suitable for a process in which the pixel data corresponding to a single pixel is processed one after another. However, the run length method cannot be effectively used with the SIMD control method since the run length method is based on the process in which a single-pixel data is supplied and processed one after another.

In the above-mentioned area method, the currently processed pixel data is compared with pixel data corresponding to the pixels surrounding the currently processed pixel. Accordingly, the area method cannot be used with the SIMD control method since if the area method is used with the SIMD control method, the pixel data being processed must be compared with pixel data which corresponds to the pixels included in the same scan line and is also being processed at the same time.

As mentioned above, the conventional isolated point removing methods are not suitable for an image processing apparatus such as a copy machine which uses the SIMD control method to increase a processing speed.

SUMMARY OF THE INVENTION

It is a general object of the present invention to provide an improved and useful image processing apparatus in which the above-mentioned problems are eliminated.

A more specific object of the present invention is to provide an image processing apparatus which can efficiently remove an isolated point.

It is another object of the present invention to provide an image processing apparatus which can efficiently remove an isolated point even when the SIMD method is used to increase a processing speed.

A further object of the present invention is to provide an image processing apparatus which can adjust condition of removal of an isolated point.

In order to achieve the above mentioned objects, there is provided according to the present invention an image processing apparatus for processing pixel data of an image, the image processing apparatus comprising:

means for defining a predetermined area comprising a matrix area and a line area extending from the matrix area, the matrix area including a plurality of pixels forming an m×n matrix where m is a number of rows and n is a number of columns and m is equal to or greater than n so that a center pixel which is being processed is located in the center of the m×n matrix, the line area including a predetermined number of pixels along a scan line in which the center pixel is included so that the predetermined number of pixels extend from the m×n matrix; and means for processing the center pixel by referring to the pixels included in the predetermined area.

According to the present invention, the center pixel is processed by referring to the pixels of the line area in addition to the pixels included in the m×n matrix area. Thus, the pixels advancing the center pixel can be reflected in a result of processing. This increases an accuracy of the result of processing such as an isolated point removing operation. The pixels included in the line area can be easily obtained by using the SIMD control process in which a plurality of pixels are simultaneously processed according to a single instruction.

In the image processing apparatus according to the present invention, the line area may include a first extending area extending on one side of the matrix area and a second extending area extending on the other side for the matrix area.

Accordingly, both the pixels preceding the center pixel and the pixels proceeding the center pixel can be referred to at the same time. Since the pixels preceding the center pixel and the pixels proceeding the center pixel arranged on the same scan line closely relate to the center pixel being processed, the center pixel can be more accurately processed than when the center pixel is processed by referring to only the pixels included in the matrix area.

Additionally, in the image processing apparatus according to the present invention, the means for processing may include:

isolated point determining means for determining that the center pixel corresponds to an isolated point when intensity of each of the pixels arranged in a periphery of the matrix area is equal to or smaller than a first threshold value and intensity of each of the pixels included in the extending area is equal to or smaller than a second threshold value; and isolated point removing means for removing the isolated point by changing intensity of the center pixel determined to correspond to the isolated point.

According to this invention, since the pixels included in the line area closely relate to the center pixel being processed, the center pixel can be accurately determined to correspond or not correspond to an isolated point by referring to the pixels included in the line area. That is, if the image being processed is a halftone dot image, at least one of the pixels included in the line area may correspond to a real dot forming the halftone dot image. Thus, the center pixel cannot be erroneously determined to be an isolated point. Additionally, the present invention facilitates use of the SIMD control method in which a plurality of pixels included in the same scan line are simultaneously processed according to a single instruction. Thus, a process time of the isolated point removing operation can be reduced.

Additionally, in the image processing apparatus according to the present invention, the means for processing may include:

isolated point determining means for determining that the center pixel corresponds to an isolated point when an intensity of each of the pixels arranged in a periphery of said matrix area is equal to or smaller than a first threshold value and an intensity of, every other pixels included in said extending area is equal to or smaller than a second threshold value.

isolated point removing means for removing the isolated point by changing intensity of the pixel determined to correspond to the isolated point.

In this invention, since every other pixels included in the line area are referred to for determining the center pixel to correspond to or not correspond to an isolated point, a number of pixels to be referred to is reduced. Thereby, a number of processes is reduced which results in an increases in the process speed.

Additionally, a length of each of the first and second extending areas may be different from a distance between adjacent dots forming a halftone dot image. Accordingly, the determination as to whether the center pixel corresponds to an isolated point is not influenced by the real component of the halftone dot image.

Additionally, the image processing apparatus may further comprise means for changing at least one of the first threshold value and the second threshold value. Accordingly, by changing the first and second threshold values, a desired result can be obtained by the isolated point removing operation. That is, for example, when a halftone pattern is printed on the background of the image being processed, the halftone pattern can be maintained or removed by appropriately setting the first and second threshold values.

Other objects, features and advantages of the present invention will become more apparent from the following detailed description when read in conjunction with the accompanying drawings.

BRIEF DESCRIPTION OF THE DRAWINGS

FIG. 6 is an illustration for explaining an isolated point determination flag;

DETAILED DESCRIPTION OF THE PREFERRED EMBODIMENT

Figure 2:
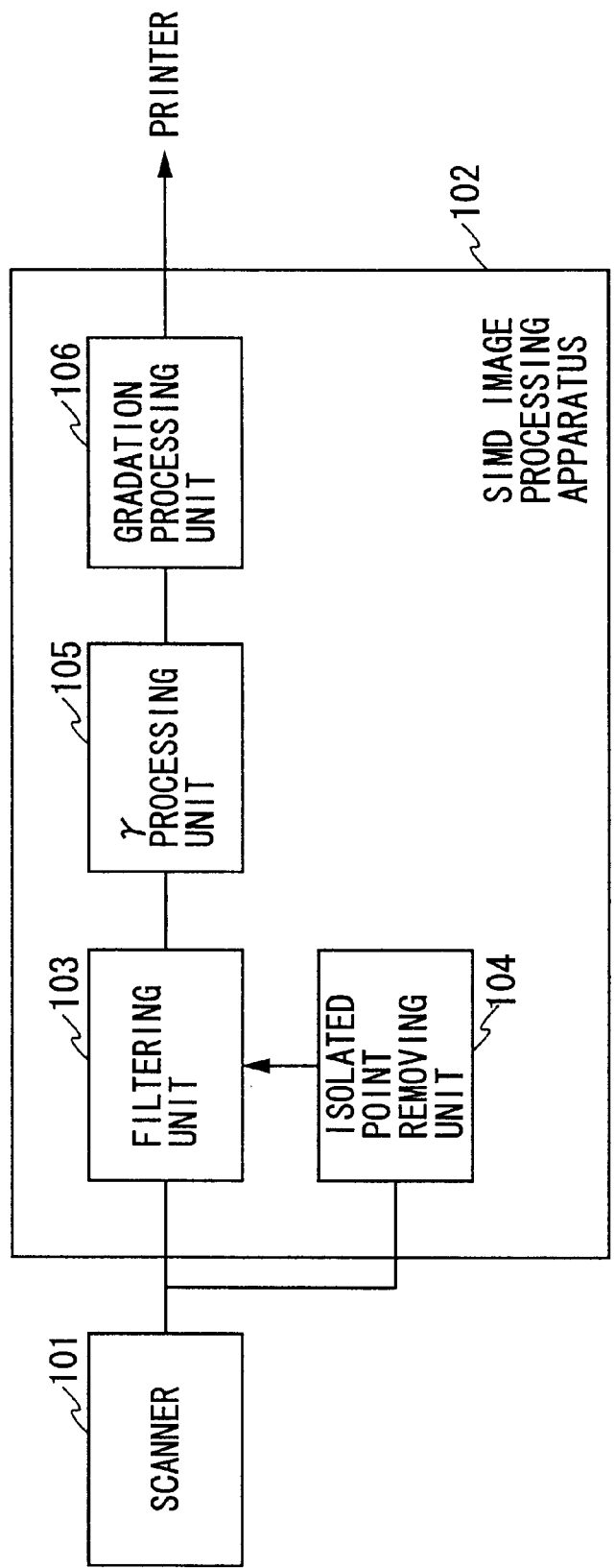
FIG. 2 is a block diagram of an image processing apparatus according to a first embodiment of the present invention.
Figure 3:
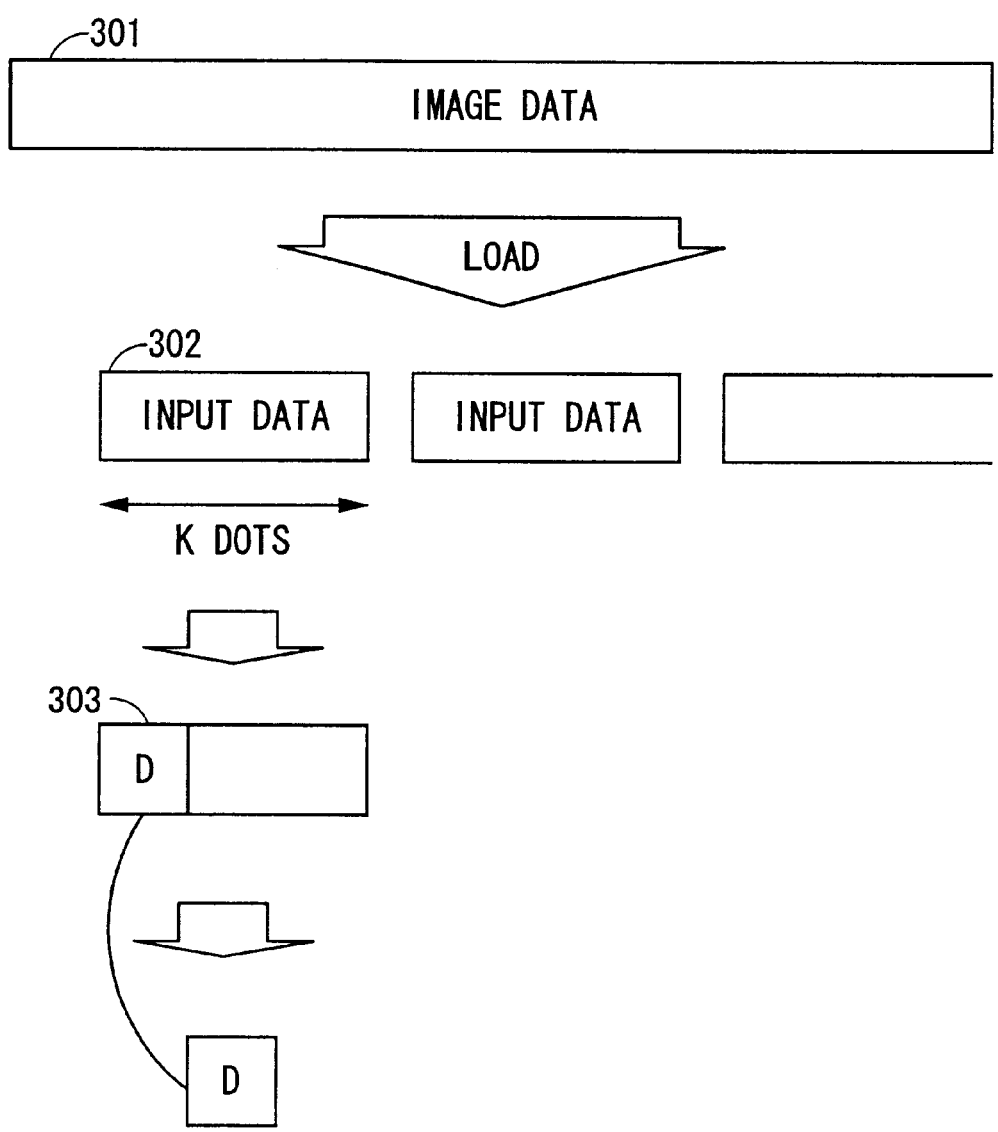
FIG. 3 is an illustration for explaining a SIMD control method.
Figure 4:
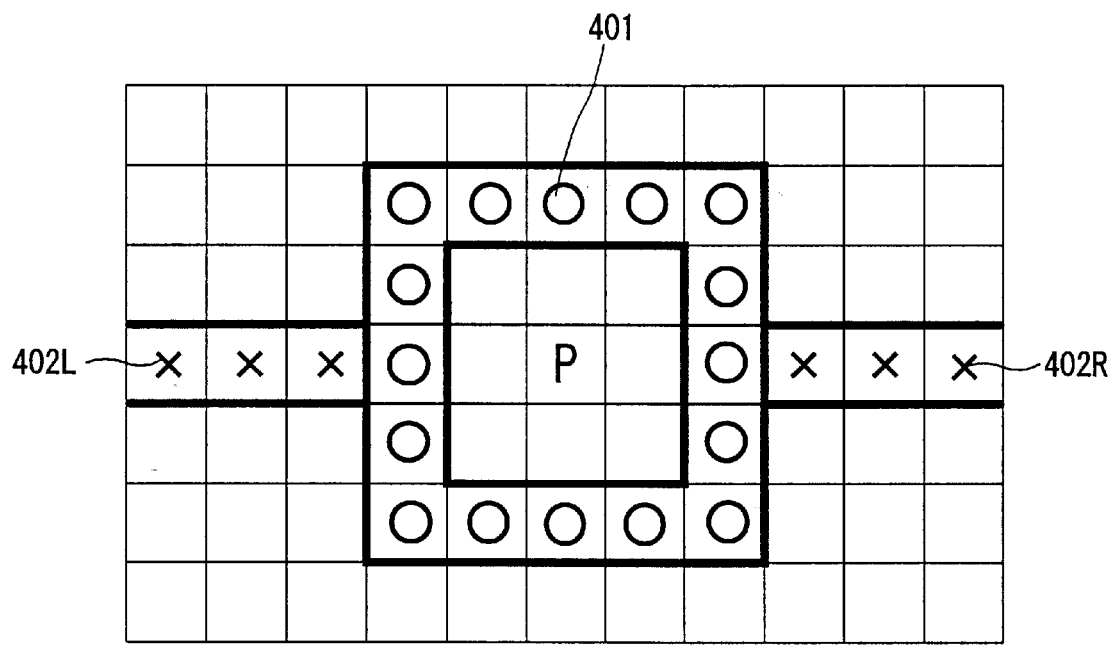
FIG. 4 is an illustration of a pixel area referred to by the image processing apparatus shown in FIG. 2.
Figure 5:
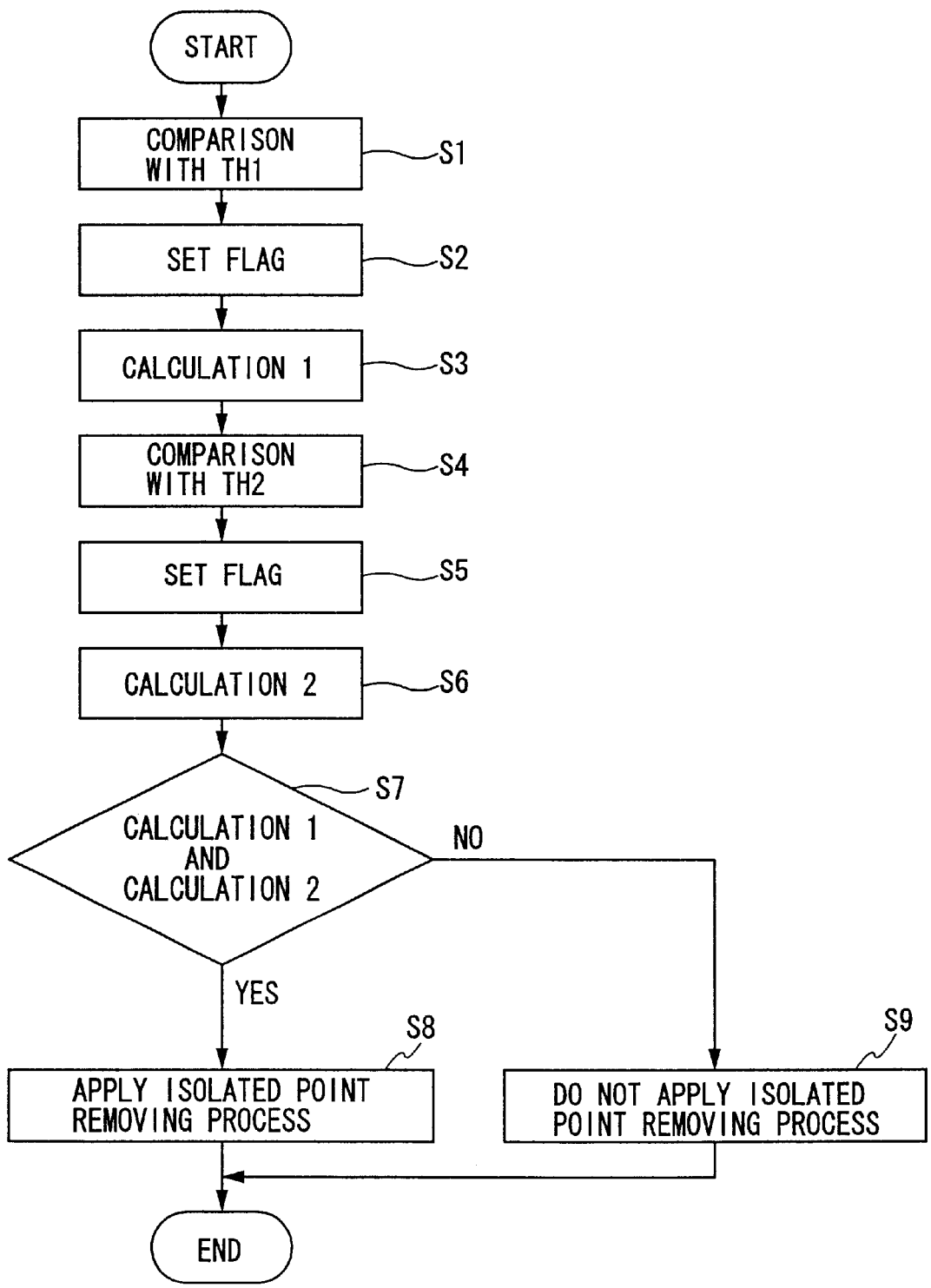
FIG. 5 is a flowchart of an isolated point removing process performed by the image processing apparatus shown in FIG. 2.

A description will now be given, with reference to FIGS. 2 to 6, of a first embodiment of the present invention. FIG. 2 is a block diagram of an image processing apparatus according to the first embodiment of the present invention. FIG. 3 is an illustration for explaining the SIMD control method. FIG. 4 is an illustration of a pixel area referred to by the image processing apparatus according to the first embodiment of the present invention. FIG. 5 is a flowchart of an isolated point removing operation performed by the image processing apparatus shown in FIG. 2. FIG. 6 is an illustration for explaining an isolated point determination flag.

As shown in FIG. 2, the image processing apparatus 102 processes pixel data supplied by a scanner 101, and outputs the processed pixel data to a printer (not shown in the figure).

The image processing apparatus 102 comprises a filtering unit 103, an isolated point removing unit 104, a gamma processing unit 105 and a gradation processing unit 106. The pixel data generated by the scanner 101 is supplied to both the filtering unit 103 and the isolated point removing unit 104 so as to simultaneously performing a filtering process and an isolated point removing process. An output of the filtering unit 103 is supplied to a printer (not shown in the figure) via the gamma processing unit 105 and the gradation processing unit 106.

The filtering unit 103 performs an enhancement process and a smoothing process on the pixel data supplied by the scanner 101. Additionally, the filtering unit 103 determines whether the pixel data corresponds to a character image so as to select enhanced pixel data when the pixel data corresponds to a character image and select the smoothed pixel data when the pixel data does not correspond to the character image. The selected data is supplied to the gamma processing unit 105.

The isolated point processing unit 104 determines whether or not the pixel data supplied by the scanner 101 corresponds to an isolated point, and stores the result of determination. Then, the isolated point removing unit 104 changes the pixel data processed by the filtering unit 103 to zero "0" when the pixel data is determined to correspond to an isolated point. When the pixel data does not correspond to an isolated point, the pixel data processed by the filtering unit is supplied to the gamma processing unit 105 without change.

Figure 1:
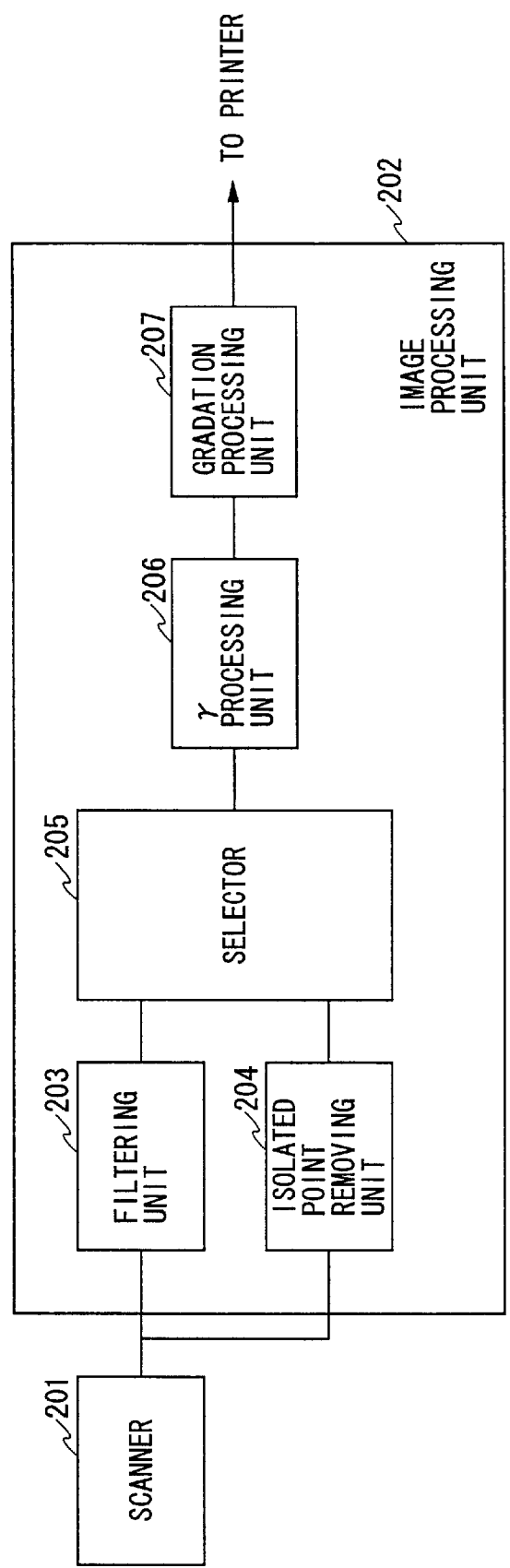
FIG. 1 is a block diagram of an image processing unit provided in a conventional copy machine.

The conventional image processing unit 202 shown in FIG. 1 inputs and outputs pixel data base on a clock signal, and is constituted by an application specification integrated circuit (ASIC) so that the image processing unit 202 performs a hardware based operation. However, the image processing apparatus shown in FIG. 2 which uses the SIMD control method can simultaneously performs a plurality of processes by a single instruction in accordance with a software based operation.

FIG. 3 is an illustration for explaining the SIMD control method used in the image processing apparatus 102 shown in FIG. 2. First, image data (pixel data) 301 is supplied to the image processing apparatus 102 by the scanner 101. After a predetermined amount of data, for example, data 302 corresponding to k dots, is supplied to the image processing apparatus 102, an instruction is performed on the data 302 on an individual k-dot data basis. The processed data is serially output on a single dot d 303 basis.

In the above-mentioned conventional run length method, an isolated point is detected by detecting a white run (consecutive white pixels) and a black run (consecutive black pixel). Accordingly, if a number of consecutive white pixels or black pixels is counted by a white pixel counter or a black pixel counter in accordance with results of comparison of pixel data corresponding to a single pixel with a predetermined threshold value, a memory for storing the results of comparison is not needed. However, the operation using such a counter is not applicable to the SIMD control method in which data corresponding to a plurality of consecutive pixels is processed at the same time.

A description will now be given of an isolated point removing process performed by the isolated point removing unit 104 shown in FIG. 2. In the isolated point removing process, a determination as to whether or not a pixel being processed corresponds to an isolated point is made by referring to other pixels included in a predetermined area surrounding the pixel being processed. FIG. 4 is an illustration of the predetermined area of which pixels are referred to for determining whether or not the pixel P being processed corresponds to an isolated point. As shown in FIG. 4, the predetermined area comprises pixels forming a 5×5 matrix area and pixels forming a line area extending from the 5×5 matrix area. The 5×5 matrix area includes the pixel P being processed so that the pixel P is located in the center of the 5×5 matrix area. Additionally, the line area extending from the 5×5 matrix area is formed by pixels located in a scan line in which the pixel P being processed is included.

More specifically, as shown in FIG. 4, intensity of each of the pixels 401 (marked by o) included in the 5×5 matrix area is compared with a threshold value TH1, the pixels 401 being arranged on the periphery of the included in the 5×5 matrix area. Additionally, intensity of each of the pixels 402L (marked by X) in the line area extending on the left side of the included in the 5×5 matrix area and each of the pixels 402R (marked by X) included in the line area on the right side of the included in the 5×5 matrix area is compared with a threshold value TH2.

FIG. 5 is a flowchart of the isolated point removing operation performed by the image processing apparatus 102 shown in FIG. 2. First, in step S1, intensity of each of the pixels 410 is compared with the threshold value TH1. Then, in step S2, a flag comprising two bits as shown in FIG. 6 is prepared in accordance with the result of comparison. In this step, a part of the flag corresponding to the most significant bit is prepared. That is, the most significant bit of the flag is set to "1" when the intensity of the pixel is equal to or smaller than the threshold value TH1, and is set to "0" when the intensity of the pixel is greater than the threshold value TH1. Then, in step S3, an operation 1 is performed so as to determine whether all flags corresponding to the pixels 401 are set to 1. That is, it is determined whether all of the pixels 401 have intensity equal to or smaller than the threshold value TH1.

Thereafter, in step S4, intensity of each of the pixels 402L and 402R is compared with the threshold value TH2. Then, in step S5, the flag is set in accordance with the result of comparison. That is, a remaining part of the flag corresponding to the least significant bit is set in this step. That is, the least significant bit of the flag is set to "1" when the intensity of the pixel is equal to or smaller than the threshold value TH2, and is set to "0" when the intensity of the pixel is greater than the threshold value TH2. Then, in step S4, an operation 2 is performed so as to determine whether all flags corresponding to the pixels 402L and 402R are set to 1. That is, it is determined whether all of the pixels 402L and 402R have intensity equal to or smaller than the threshold value TH2.

Thereafter, it is determined, in step S7, whether or not both the results of the operation 1 and the operation 2 are affirmative. If the determination of step S7 is affirmative (YES), the routine proceeds to step S8. In step S8, the pixel P being processed is determined to correspond to an isolated point, and the pixel data of the pixel P being processed is subjected to an isolated point removing process. That is, for example, the pixel data of the pixel P is changed to pixel data of a white pixel, and the routine is ended.

On the other hand, if the determination of step S7 is negative (NO), the routine proceeds to step S9. In step S9, the pixel P being processed is determined not to correspond to an isolated point, and the pixel data of the pixel P being processed is not subjected to the isolated point removing process, and the routine is ended.

Figure 7:
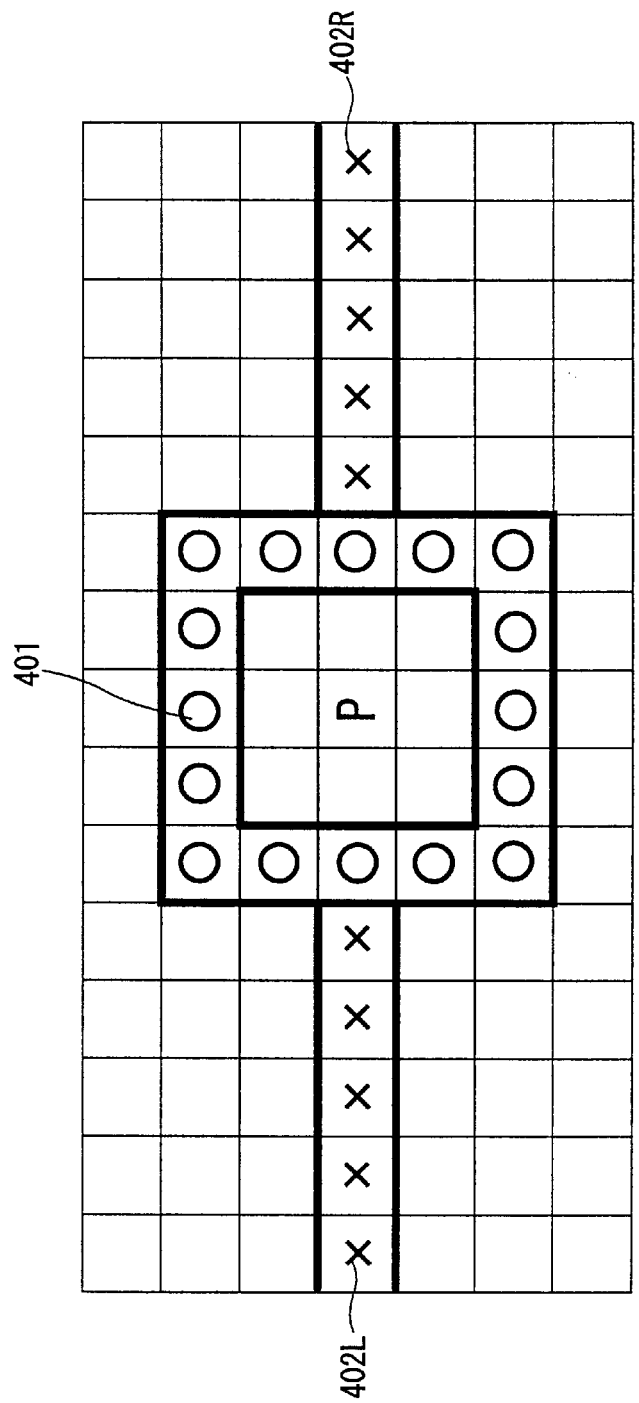
FIG. 7 is an illustration of a variation of the pixel area shown in FIG. 4.

It should be noted that the number of pixels 402L or 402R is not limited to three as shown in FIG. 4, and five pixels may be used as shown in FIG. 7 so as to improve accuracy of determination of an isolated point.

According to the present embodiment, the pixel P is processed by referring to the pixels 402L and 402R of the line area in addition to the pixel pixels 401 included in the 5×5 matrix area. Thus, the pixel data of the pixels 402L and 402R remote from the pixel P can be reflected in a result of processing. This increases an accuracy of the result of the isolated point removing operation. The pixel data of the pixels 402L and 402R included in the line area can be easily obtained by using the SIMD control process in which a plurality of pixels are simultaneously processed according to a single instruction.

Additionally, in the present embodiment, both the pixels 402L preceding the pixel P and the pixels 402R proceeding the pixel P can be referred to at the same time. Since the pixels 402L preceding the pixel P and the pixels 402R proceeding the pixel P arranged on the same scan line closely relate to the pixel P being processed, the pixel P can be more accurately processed than when the pixel P is processed by referring to only the pixels 401 included in the 5×5 matrix area.

Figure 8:
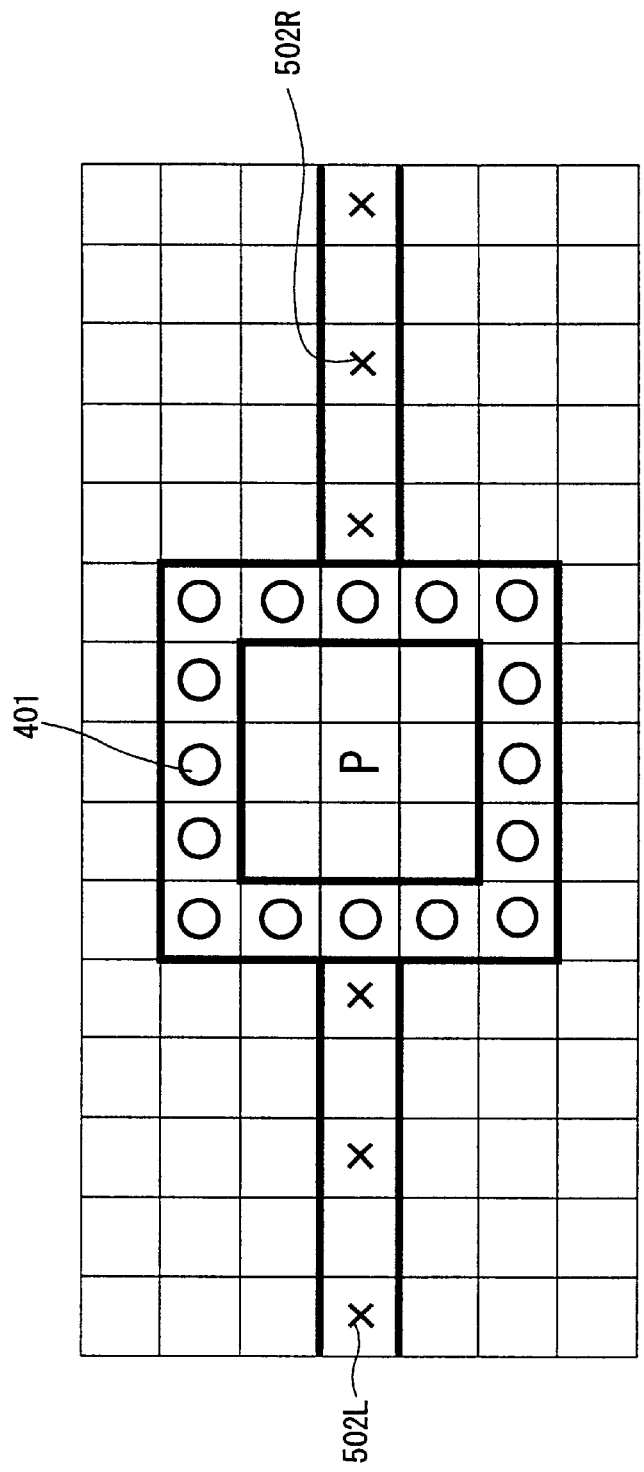
FIG. 8 is an illustration of a pixel area referred to by an image processing apparatus according to a second embodiment of the present invention.

A description will now be given, with reference to FIG. 8, of a second embodiment of the present invention. FIG. 8 is an illustration of a predetermined area of which pixels are referred to for determining whether or not the pixel P being processed corresponds to an isolated point. The predetermined area shown in FIG. 8 is basically the same as that shown in FIG. 7 except that every other pixels in the line area are subjected to the comparison with the threshold value TH2.

More specifically, as shown in FIG. 8, intensity of each of the pixels 401 (marked by ○) included in the 5×5 matrix area is compared with a threshold value TH1, the pixels 401 being arranged on the periphery of the included in the 5×5 matrix area. Additionally, intensity of every other pixels 502L (marked by X) in the line area extending on the left side of the included in the 5×5 matrix area and every other pixels 502R (marked by X) included in the line area on the right side of the included in the 5×5 matrix area are compared with the threshold value TH2.

According to this embodiment, a number of comparing operations with the threshold value TH2 can be reduced while maintaining an accurate determination of an isolated point as provided by the used of the predetermined area shown in FIG. 7.

A description will now be give of a third embodiment of the present invention. A structure of an image processing apparatus according to the third embodiment of the present invention is the same as that of the image processing apparatus according to the first or second embodiment of the present invention except for each of the threshold values TH1 and TH2 being variable in accordance with a state of an image to be processed.

Since the background of the image is not always "0", the threshold value TH2 must be a value at which a background part can be recognized as an area in which white pixels are consecutively arranged. Additionally, since the threshold value TH1 is used for determination of the pixels 401 located in the matrix area surrounding the pixel P being processed, the determination as to whether the pixel P corresponds to an isolated point cannot be made if the threshold value TH1 is smaller than the intensity of the background of the image. Accordingly, the threshold value TH1 must be at minimum equal to the threshold value TH2.

Figure 9:
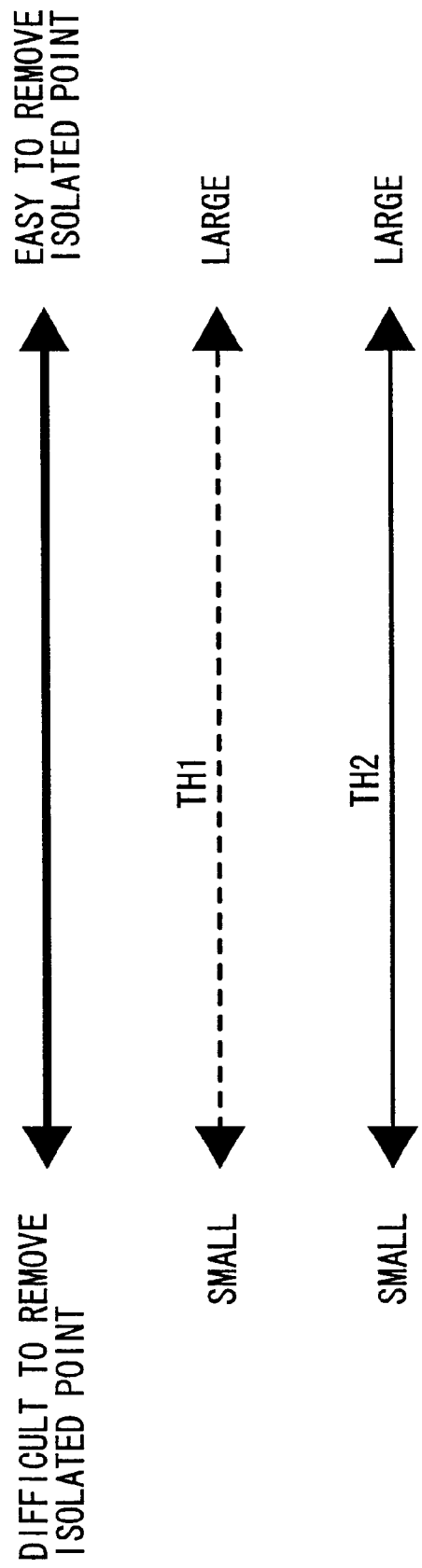
FIG. 9 is an illustration for explaining a level of each of the threshold values TH1 and TH2.

Additionally, by varying the threshold values TH1 and TH2 independent from each other, a level of removal of an isolated point can be changed. As shown in FIG. 9, an isolated point can be more easily removed as each of the threshold values TH1 and TH2 is increased. On the other hand, removal of an isolated point can be more difficult as each of the threshold values TH1 and TH2 is decreased. Accordingly, if there is a dot pattern on the background of the image and if it is desired to maintain the dot pattern, each of the threshold values TH1 and TH2 may be individually set to an appropriate value so that the desired image having the dot pattern but lacking isolated points can be formed.

In the above-mentioned embodiments, the 5×5 matrix is used for selecting the pixels 401 which surrounds the pixel P being processed, the number of rows and the number of columns of the matrix may be changed according to the image resolution used by the image processing apparatus such as 400 dpi, 600 dpi or 1,200 dpi. Additionally, the number of pixels 402L and 402R included in the line area may be changed in accordance with a type of an image to be processed so as to obtain a desired processed image.

The present invention is not limited to the specifically disclosed embodiments, and variations and modifications will be made without departing from the scope of the present invention.

The present application is based on Japanese priority application No. 10-367788, the contents of which are hereby incorporated by reference.

What is claimed is:

1. An image processing apparatus for processing pixel data of an image, the image processing apparatus comprising:

means for defining a predetermined area comprising a matrix area and a line area extending from the matrix area, said matrix area including a plurality of pixels forming an m×n matrix where m is a number of rows and n is a number of columns and m is equal to or greater than n so that a center pixel which is being processed is located in the center of said m×n matrix, said line area including a predetermined number of pixels along a scan line, said scan line including said center pixel, said predetermined number of pixels extending outwardly from said m×n matrix and not including pixels inside of said m×n matrix; and means for processing said center pixel by referring to said predetermined number of pixels and said pixels in said matrix area.

2. The image processing apparatus as claimed in claim 1, wherein said line area includes a first extending area extending on one side of said matrix area and a second extending area extending on the other side of said matrix area.

3. An image processing apparatus for processing pixel data of an image, the image processing apparatus comprising:

means for defining a predetermined area comprising a matrix area and a line area extending from the matrix area, said matrix area including a plurality of pixels forming an m×n matrix where m is a number of rows and n is a number of columns and m is equal to or greater than n so that a center pixel which is being processed is located in the center of said m×n matrix, said line area including a predetermined number of pixels along a scan line in which the center pixel is included so that the predetermined number of pixels extend from said m×n matrix; and means for processing the center pixel by referring to the pixels included in said predetermined area, wherein said means for processing includes: isolated point determining means for determining that the center pixel corresponds to an isolated point when intensity of each of the pixels arranged in a periphery of said matrix area is equal to or smaller than a first threshold value and intensity of each of the pixels included in said extending area is equal to or smaller than a second threshold value; and isolated point removing means for removing the isolated point by changing intensity of the pixel determined to correspond to the isolated point, wherein the line area includes a part containing the center pixel of the matrix area and a part extending outwardly from a side of the matrix area.

4. The image processing apparatus as claimed in claim 3,
wherein said line area includes a first extending area extending on one side of said matrix area and a second extending area extending on the other side of said matrix area, and wherein a length of each of said first and second extending areas is different from a distance between adjacent points forming a halftone dot image.

5. The image processing apparatus as claimed in claim 3, further comprising means for changing at least one of the first threshold value and the second threshold value.

6. An image processing apparatus for processing pixel data of an image, the image processing apparatus comprising:

means for defining a predetermined area comprising a matrix area and a line area extending from the matrix area, said matrix area including a plurality of pixels forming an m×n matrix where m is a number of rows and n is a number of columns and m is equal to or greater than n so that a center pixel which is being processed is located in the center of said m×n matrix, said line area including a predetermined number of pixels along a scan line in which the center pixel is included so that the predetermined number of pixels extend from said m×n matrix; and means for processing the center pixel by referring to the pixels included in said predetermined area, wherein said means for processing includes: isolated point determining means for determining that the center pixel corresponds to an isolated point when an intensity of each of the pixels arranged in a periphery of said matrix area is equal to or smaller than a first threshold value and an intensity of every other pixels included in said extending area is equal to or smaller than a second threshold value; and isolated point removing means for removing the isolated point by changing intensity of the pixel determined to correspond to the isolated point, wherein said line area includes a part containing the center pixel of the matrix area and apart extending outwardly from a side of the matrix area, and wherein said line includes a first extending area extending on one side of said matrix area and a second extending area extending on the other side of said matrix area.

7. The image processing apparatus as claimed in claim 6, wherein a length of each of said first and second extending areas is different from a distance between adjacent points forming a halftone dot image.

8. The image processing apparatus as claimed in claim 6, further comprising means for changing at least one of the first threshold value and the second threshold value.

9. An image processing apparatus for processing pixel data of an image, the image processing apparatus comprising:

a defining mechanism configured to define a predetermined area comprising a matrix area and a line area extending from the matrix area, said matrix area including a plurality of pixels forming an m×n matrix where m is a number of rows and n is a number of columns and m is equal to or greater than n so that a center pixel which is being processed is located in the center of said m×n matrix, said line area including a predetermined number of pixels along a scan line, said scan line including said center pixel said predetermined number of pixels extending outwardly from said m×n matrix and not including pixels inside of said m×n matrix; and a processing mechanism configured to process said center pixel by referring to said predetermined number of pixels and said pixels in said matrix area.

10. The image processing apparatus as claimed in claim 9, wherein said line area includes a first extending area extending on one side of said matrix area and a second extending area extending on the other side of said matrix area.

11. An image processing apparatus for processing pixel data of an image, the image processing apparatus comprising:

a defining mechanism configured to define a predetermined area comprising a matrix area and a line area extending from the matrix area, said matrix area including a plurality of pixels forming an m×n matrix where m is a number of rows and n is a number of columns and m is equal to or greater than n so that a center pixel which is being processed is located in the center of said m×n matrix, said line area including a predetermined number of pixels along a scan line, said scan line including said center pixel, said predetermined number of pixels extending outwardly from said m×n matrix and not including pixels inside of said m×n matrix; and a processing mechanism configured to process said center pixel by referring to said predetermined number of pixels and said pixels in said matrix area, wherein said processing mechanism includes: a determining mechanism configured to determine that the center pixel corresponds to an isolated point when intensity of each of the pixels arranged in a periphery of said matrix area is equal to or smaller than a first threshold value and intensity of each of the pixels included in said extending area is equal to or smaller than a second threshold value; and a removing mechanism configured to remove the isolated point by changing intensity of the pixel determined to correspond to the isolated point.

12. The image processing apparatus as claimed in claim 11, wherein said line area includes a first extending area extending on one side of said matrix area and a second extending area extending on the other side of said matrix area, and wherein a length of each of said first and second extending areas is different from a distance between adjacent points forming a halftone dot image.

13. The image processing apparatus as claimed in claim 11, further comprising a changing mechanism configured to change at least one of the first threshold value and the second threshold value.

14. An image processing apparatus for processing pixel data of an image, the image processing apparatus comprising:

a defining mechanism configured to define a predetermined area comprising a matrix area and a line area extending from the matrix area, said matrix area including a plurality of pixels forming an m×n matrix where m is a number of rows and n is a number of columns and m is equal to or greater than n so that a center pixel which is being processed is located in the center of said m×n matrix, said line area including a predetermined number of pixels along a scan line, said scan line including said center pixel, said predetermined number of pixels extending outwardly from said m×n matrix and not including pixels inside of said m×n matrix; and a processing mechanism configured to process said center pixel by referring to said predetermined number of pixels and said pixels in said matrix area, wherein said processing mechanism includes: a determining mechanism configured to determine that the center pixel corresponds to an isolated point when an intensity of each of the pixels arranged in a periphery of said matrix area is equal to or smaller than a first threshold value and an intensity of every other pixels included in said extending area is equal to or smaller than a second threshold value; and a removing mechanism configured to remove the isolated point by changing intensity of the pixel determined to correspond to the isolated point, and wherein said line includes a first extending area extending on one side of said matrix area and a second extending area extending on the other side of said matrix area.

15. The image processing apparatus as claimed in claim 14, wherein a length of each of said first and second extending areas is different from a distance between adjacent points forming a halftone dot image.

16. The image processing apparatus as claimed in claim 14, further comprising a changing mechanism configured to change at least one of the first threshold value and the second threshold value.

17. An image processing method for processing pixel data of an image, the image processing method comprising:

defining a predetermined area comprising a matrix area and a line area extending from the matrix area, said matrix area including a plurality of pixels forming an m×n matrix where m is a number of rows and n is a number of columns and m is equal to or greater than n so that a center pixel which is being processed is located in the center of said m×n matrix, said line area including a predetermined number of pixels along a scan line, said scan line including said center pixels, said predetermined number of pixels extending outwardly from said m×n matrix and not including pixels inside of said m×n matrix; and processing said center pixel by referring to said predetermined number of pixels and said pixels in said matrix area.

18. The image processing method as claimed in claim 17, wherein said line area includes a first extending area extending on one side of said matrix area and a second extending area extending on the other side of said matrix area.

19. An image processing method for processing pixel data of an image, the image processing method comprising:

defining a predetermined area comprising a matrix area and a line area extending from the matrix area, said matrix area including a plurality of pixels forming an m×n matrix where m is a number of rows and n is a number of columns and m is equal to or greater than n so that a center pixel which is being processed is located in the center of said m×n matrix, said line area including a predetermined number of pixels along a scan line, said scan line including said center pixel, said predetermined number of pixels extending outwardly from said m×n matrix and not including pixels inside of said m×n matrix; and processing said center pixel by referring to said predetermined number of pixels and said pixels in said matrix area, said processing step including: determining that the center pixel corresponds to an isolated point when intensity of each of the pixels arranged in a periphery of said matrix area is equal to or smaller than a first threshold value and intensity of each of the pixels included in said extending area is equal to or smaller than a second threshold value; and removing the isolated point by changing intensity of the pixel determined to correspond to the isolated point.

20. The image processing method as claimed in claim 19, wherein said line area includes a first extending area extending on one side of said matrix area and a second extending area extending on the other side of said matrix area, and wherein a length of each of said first and second extending areas is different from a distance between adjacent points forming a halftone dot image.

21. The image processing method as claimed in claim 19, further comprising changing at least one of the first threshold value and the second threshold value.

22. An image processing method for processing pixel data of an image, the image processing method comprising:

defining a predetermined area comprising a matrix area and a line area extending from the matrix area, said matrix area including a plurality of pixels forming an m×n matrix where m is a number of rows and n is a number of columns and m is equal to or greater than n so that a center pixel which is being processed is located in the center of said m×n matrix, said line area including a predetermined number of pixels along a scan line, said scan line including said center pixel, said predetermined number of pixels extending outwardly from said m×n matrix and not including pixels inside of said m×n matrix; and processing said center pixel by referring to said predetermined number of pixels and said pixels in said matrix area, wherein said processing step includes: determining that the center pixel corresponds to an isolated point when an intensity of each of the pixels arranged in a periphery of said matrix area is equal to or smaller than a first threshold value and an intensity of every other pixels included in said extending area is equal to or smaller than a second threshold value; and removing the isolated point by changing intensity of the pixel determined to correspond to the isolated point, and wherein said line includes a first extending area extending on one side of said matrix area and a second extending area extending on the other side of said matrix area.

23. The image processing method as claimed in claim 22, wherein a length of each of said first and second extending areas is different from a distance between adjacent points forming a halftone dot image.

24. The image processing method as claimed in claim 22, further comprising changing at least one of the first threshold value and the second threshold value.

* * * * *